(12) United States Patent
Lo et al.

(10) Patent No.: US 12,034,588 B1
(45) Date of Patent: Jul. 9, 2024

(54) DIAGNOSTICS REPORTING FOR WIDE AREA NETWORK ASSURANCE SYSTEM

(71) Applicant: Juniper Networks, Inc., Sunnyvale, CA (US)

(72) Inventors: Juei Cheng Lo, Los Altos, CA (US); Kaushik Adesh Agrawal, Chelmsford, MA (US); Prashant Kumar, Cupertino, CA (US)

(73) Assignee: JUNIPER NETWORKS, INC., Sunnyvale, CA (US)

( * ) Notice: Subject to any disclaimer, the term of this patent is extended or adjusted under 35 U.S.C. 154(b) by 0 days.

(21) Appl. No.: 18/148,976

(22) Filed: Dec. 30, 2022

(51) Int. Cl.
G06F 15/16 (2006.01)
H04L 41/0659 (2022.01)
H04L 41/0663 (2022.01)
H04L 43/10 (2022.01)

(52) U.S. Cl.
CPC ...... *H04L 41/0663* (2013.01); *H04L 41/0661* (2023.05); *H04L 43/10* (2013.01)

(58) Field of Classification Search
CPC .. H04L 41/0663; H04L 41/0661; H04L 43/10
USPC ........................................................ 709/239
See application file for complete search history.

(56) References Cited

U.S. PATENT DOCUMENTS

| | | | | |
|---|---|---|---|---|
| 6,574,753 B1 * | 6/2003 | Haynes | ................ | G06F 11/079 714/4.11 |
| 6,810,420 B1 * | 10/2004 | Buse | .................. | H04L 61/5038 709/224 |
| 6,880,100 B2 * | 4/2005 | Mora | ...................... | H04L 69/40 709/224 |
| 6,975,613 B1 * | 12/2005 | Johansson | ............. | H04W 72/12 370/468 |
| 7,058,050 B2 * | 6/2006 | Johansson | ............... | H04L 41/00 370/386 |
| 7,151,884 B1 | 12/2006 | Rayes et al. | | |

(Continued)

FOREIGN PATENT DOCUMENTS

EP 2627038 A1 8/2013

OTHER PUBLICATIONS

Extended Search Report from counterpart European Application No. 23159336.9 dated Aug. 21, 2023, 12 pp.

(Continued)

*Primary Examiner* — Alicia Baturay
(74) *Attorney, Agent, or Firm* — Shumaker & Sieffert, P.A.

(57) ABSTRACT

Techniques are disclosed for reporting diagnostics data by a first network device to a cloud-based Wide Area Network (WAN) assurance system, responsive to the first network device detecting a communication issue with the cloud-based WAN assurance system. For example, the first network device detects an issue with sending telemetry data to the cloud-based WAN assurance system via a first communication path. In response, the first network device determines a second network device that has connectivity to the WAN assurance system. The first network device sends diagnostics data to the second network device along a second communication path for forwarding to the cloud-based WAN assurance system. The cloud-based WAN assurance system receives the diagnostics data from the second network device. The cloud-based WAN assurance system controls the second network device to remediate the first network device based on the diagnostics data.

18 Claims, 4 Drawing Sheets

(56) References Cited

U.S. PATENT DOCUMENTS

| | | | | |
|---|---|---|---|---|
| 7,152,099 B1* | 12/2006 | Arens | H04L 61/5046 | 709/221 |
| 7,450,577 B2* | 11/2008 | Johansson | H04W 92/02 | 370/386 |
| 7,454,494 B1* | 11/2008 | Hedayat | H04L 45/00 | 709/224 |
| 7,583,593 B2* | 9/2009 | Guichard | H04L 41/0677 | 370/242 |
| 7,848,263 B2* | 12/2010 | Chhabra | H04W 8/26 | 370/254 |
| 7,881,207 B2* | 2/2011 | Dunbar | H04L 43/50 | 370/241 |
| 8,037,176 B2* | 10/2011 | Hopkins | H04L 67/104 | 709/224 |
| 8,042,004 B2* | 10/2011 | Ing | G06F 11/079 | 714/43 |
| 8,108,495 B1* | 1/2012 | Zuk | H04L 41/0853 | 709/220 |
| 8,116,233 B2* | 2/2012 | Lambert | H04L 61/5084 | 370/254 |
| 8,326,952 B2* | 12/2012 | Matsuda | H04L 41/0803 | 709/220 |
| 8,380,827 B2* | 2/2013 | Olsson | G06F 3/1225 | 709/221 |
| 8,381,013 B2* | 2/2013 | Zheng | H04L 41/0677 | 714/48 |
| 8,755,306 B1* | 6/2014 | Chhabra | H04W 8/26 | 370/254 |
| 8,769,278 B2* | 7/2014 | Abuan | H04L 9/32 | 713/168 |
| 8,924,304 B2* | 12/2014 | Devine | H04L 65/611 | 705/56 |
| 9,137,101 B2* | 9/2015 | Keesara | H04L 43/0811 | |
| 9,237,067 B1* | 1/2016 | Chhabra | H04L 41/0803 | |
| 9,306,902 B2* | 4/2016 | Arickan | H04L 61/5014 | |
| 9,535,714 B2* | 1/2017 | Olsson | G06F 3/1285 | |
| 9,585,087 B1* | 2/2017 | Chhabra | H04W 76/11 | |
| 9,729,439 B2* | 8/2017 | MeLampy | H04L 47/2483 | |
| 9,729,682 B2* | 8/2017 | Kumar | H04L 69/325 | |
| 9,762,485 B2* | 9/2017 | Kaplan | H04L 49/30 | |
| 9,819,587 B1* | 11/2017 | Tracy | H04L 45/7453 | |
| 9,832,082 B2* | 11/2017 | Dade | H04L 43/04 | |
| 9,871,748 B2* | 1/2018 | Gosselin | H04L 43/04 | |
| 9,985,883 B2* | 5/2018 | MeLampy | H04L 61/00 | |
| 10,200,264 B2* | 2/2019 | Menon | H04L 43/0829 | |
| 10,277,506 B2* | 4/2019 | Timmons | H04L 45/54 | |
| 10,432,522 B2* | 10/2019 | Kaplan | H04L 61/2521 | |
| 10,771,475 B2* | 9/2020 | Chen | H04L 63/1408 | |
| 10,789,077 B2* | 9/2020 | VanBlon | G06F 9/4451 | |
| 10,862,742 B2 | 12/2020 | Singh | | |
| 10,958,537 B2* | 3/2021 | Safavi | H04W 16/22 | |
| 10,958,585 B2* | 3/2021 | Safavi | H04W 24/02 | |
| 10,970,152 B2* | 4/2021 | Brooks | G06F 11/079 | |
| 10,985,969 B2* | 4/2021 | Safavi | H04L 41/40 | |
| 11,075,824 B2* | 7/2021 | McCulley | H04L 43/04 | |
| 11,190,418 B2* | 11/2021 | Grosser | H04L 43/12 | |
| 11,570,038 B2 | 1/2023 | Wang et al. | | |
| 11,743,151 B2* | 8/2023 | Safavi | H04L 41/16 | 709/224 |
| 2003/0196148 A1* | 10/2003 | Harrisville-Wolff | H04L 41/0654 | 714/47.1 |
| 2009/0327187 A1* | 12/2009 | Lo | H04L 67/104 | 706/46 |
| 2010/0054154 A1* | 3/2010 | Lambert | H04L 61/5084 | 370/254 |
| 2011/0252144 A1* | 10/2011 | Tung | H04L 67/104 | 709/227 |
| 2013/0124607 A1 | 5/2013 | Griffith et al. | | |
| 2017/0235792 A1* | 8/2017 | Mawji | G06F 16/9538 | 707/769 |
| 2019/0098553 A1* | 3/2019 | Koshy | H04W 40/08 | |
| 2020/0382387 A1 | 12/2020 | Pasupathy et al. | | |
| 2020/0403890 A1 | 12/2020 | McCulley et al. | | |
| 2021/0157796 A1 | 5/2021 | Fast et al. | | |
| 2021/0194782 A1* | 6/2021 | Jump | H04L 41/12 | |
| 2022/0329450 A1* | 10/2022 | Servat | G06F 13/4221 | |
| 2022/0337495 A1 | 10/2022 | Safavi | | |
| 2022/0346160 A1* | 10/2022 | Agrawal | H04W 76/10 | |
| 2023/0231762 A1* | 7/2023 | Wang | H04L 41/064 | 709/224 |

OTHER PUBLICATIONS

U.S. Appl. No. 17/449,311, filed Sep. 29, 2021, by Scholz et al.
U.S. Appl. No. 17/812,676, filed Jul. 14, 2022, by Wang et al.
U.S. Appl. No. 17/935,704, filed Sep. 27, 2022, by Wang et al.

* cited by examiner

DIAGNOSTICS REPORTING FOR WIDE AREA NETWORK ASSURANCE SYSTEM

TECHNICAL FIELD

This disclosure generally relates to computer networks and, more specifically, to detecting, troubleshooting, and remediating network issues.

BACKGROUND

A computer network is a collection of interconnected computing devices that can exchange data and share resources. In a packet-based network, such as the Internet, the computing devices communicate data by dividing the data into variable-length blocks called packets, which are individually routed across the network from a source device to a destination device. The destination device extracts the data from the packets and assembles the data into its original form.

Network providers and organizations (e.g., enterprises) may have networks that include multiple layers of network devices, such as gateways, routers, switches, and access points. Commercial premises or sites, such as offices, hospitals, airports, stadiums, or retail outlets, often install complex wired and wireless network systems, including a network of wireless access points (APs), throughout the premises to provide wireless network services to one or more wireless client devices (or simply, "clients"). APs are physical, electronic devices that enable other devices to wirelessly connect to a wired network using various wireless networking protocols and technologies, such as wireless local area networking protocols conforming to one or more of the IEEE 802.11 standards (i.e., "WiFi"), Bluetooth/Bluetooth Low Energy (BLE), mesh networking protocols such as ZigBee or other wireless networking technologies. Many different types of wireless client devices, such as laptop computers, smartphones, tablets, wearable devices, appliances, and Internet of Things (IoT) devices, incorporate wireless communication technology and can be configured to connect to wireless access points when the device is in range of a compatible wireless access point in order to access a wired network.

Further, organizations and network providers may use software-defined networking in a wide area network (SD-WAN) to manage network connectivity among distributed locations (e.g., sites), such as remote branch or central offices or data centers. SD-WAN extends SDN to enable businesses to create connections quickly and efficiently over the WAN, which may include the Internet or other transport networks that offer various WAN connection types, such as Multi-Protocol Label Switching (MPLS)-based connections, mobile network connections (e.g., 3G, Long-Term Evolution (LTE), 5G), Asymmetric Digital Subscriber Line (ADSL), and so forth. Such connections are typically referred to as "WAN links" or, more simply, as "links." SD-WAN is considered a connectivity solution that is implemented with WAN links as an overlay on top of traditional WAN access, making use of the above or other WAN connection types.

SUMMARY

In general, the disclosure describes techniques for the reporting of diagnostics data by a network device to a WAN assurance system, in response to the network device detecting a communication issue with the WAN assurance system, and the remediation of such a communication issue. For example, a first network device periodically may send telemetry data to a WAN assurance system over a first communication path. The first communication path may be, e.g., a WAN communication path such as a Long-term Evolution (LTE) path. In some examples, the first network device may detect an issue with sending telemetry data to the WAN assurance system via the first communication path. In response to detecting the issue, the first network device sends diagnostics data to a second network device along a second communication path. Typically, the second network device is a peer of the first network device and possesses a separate, independent functional communication path to the WAN assurance system. The second communication path may be, e.g., a Local Area Network (LAN) communication path, such as an Ethernet or broadband path. The diagnostics data may include information describing the issue with sending telemetry data to the WAN assurance system via the first communication path. The second network device forwards the diagnostics data to the WAN assurance system to aid the WAN assurance system in troubleshooting and remediating the issue.

In some examples, the first network device may select the second network device from a plurality of other network devices to receive the diagnostics data of the first network device. For instance, each network device of the plurality of network devices computes a score indicative of a reliability of the network device to receive and forward diagnostics data to the WAN assurance system. Each network device may periodically compute its own score and share this score with peer network devices. Upon detecting the issue in sending telemetry data to the WAN assurance system via the first communication path, the first network device may use the respective scores of peer network devices to select the second network device to receive the diagnostics data for the first network device. The second network device may forward, to the WAN assurance system, the diagnostics data on behalf of the first network device.

In some examples, upon receiving the diagnostics data for the first network device, the WAN assurance system may use the second network device to perform troubleshooting, remediation, or repair of the first network device. For example, the WAN assurance system may use the diagnostics data for the first network device to identify a root cause of the issue with sending telemetry data to the WAN assurance system via the first communication path. The WAN assurance system may subsequently perform a corrective action to address the root cause. For example, the WAN assurance system may provide a software image to the second network device and cause the second network device to install the software image upon the first network device. As another example, the WAN assurance system may cause the second network device to reboot the first network device or restart a software application executed by the first network device.

The techniques of the disclosure may provide specific improvements to the computer-related field of traffic engineering and path selection that have practical applications. For example, the techniques of the disclosure may enable a network device experiencing connectivity problems to a WAN assurance system to nevertheless inform the WAN assurance system of such connectivity problems, thereby allowing the WAN assurance system to identify and remedy such problems more rapidly than conventional systems. Furthermore, the techniques of the disclosure may enable a network device to use identify a peer network device that may be a most optimal or reliable candidate for forwarding diagnostics data to the WAN assurance system on behalf of the network device. Furthermore, the techniques of the disclosure may enable a network device to include various criteria, such as the utilization of a peer network device, when selecting such a peer so as to both increase robustness and avoid overutilization of peer network devices. Furthermore, the techniques of the disclosure may enable a WAN assurance system to use such peer network devices to perform various troubleshooting operations on a network device experiencing failures in connectivity to the WAN assurance system so as to remedy such failures in connectivity.

In one example, this disclosure describes a method comprising: detecting, by a first network device, an issue with sending telemetry data to a wide area network (WAN) assurance system via a first network path; in response to detecting the issue, determining, by the first network device, that a second network device has connectivity to the WAN assurance system; and based on the determination that the second network device has connectivity to the WAN assurance system, sending, by the first network device and to the second network device via a second network path different from the first network path, diagnostics data for the second network device to forward to the WAN assurance system.

In another example, this disclosure describes a first network device configured to: detect an issue with sending telemetry data to a wide area network (WAN) assurance system via a first network path; in response to detecting the issue, determine that a second network device has connectivity to the WAN assurance system; and based on the determination that the second network device has connectivity to the WAN assurance system, send, to the second network device via a second network path different from the first network path, diagnostics data for the second network device to forward to the WAN assurance system.

In another example, this disclosure describes a non-transitory, computer-readable medium comprising instructions that, when executed, are configured to cause processing circuitry of a first network device to: detect an issue with sending telemetry data to a wide area network (WAN) assurance system via a first network path; in response to detecting the issue, determine that a second network device has connectivity to the WAN assurance system; and based on the determination that the second network device has connectivity to the WAN assurance system, send, to the second network device via a second network path different from the first network path, diagnostics data for the second network device to forward to the WAN assurance system.

The details of one or more examples of the techniques of this disclosure are set forth in the accompanying drawings and the description below. Other features, objects, and advantages of the techniques will be apparent from the description and drawings, and from the claims.

BRIEF DESCRIPTION OF DRAWINGS

Like reference characters refer to like elements throughout the figures and description.

DETAILED DESCRIPTION

Figure 1:
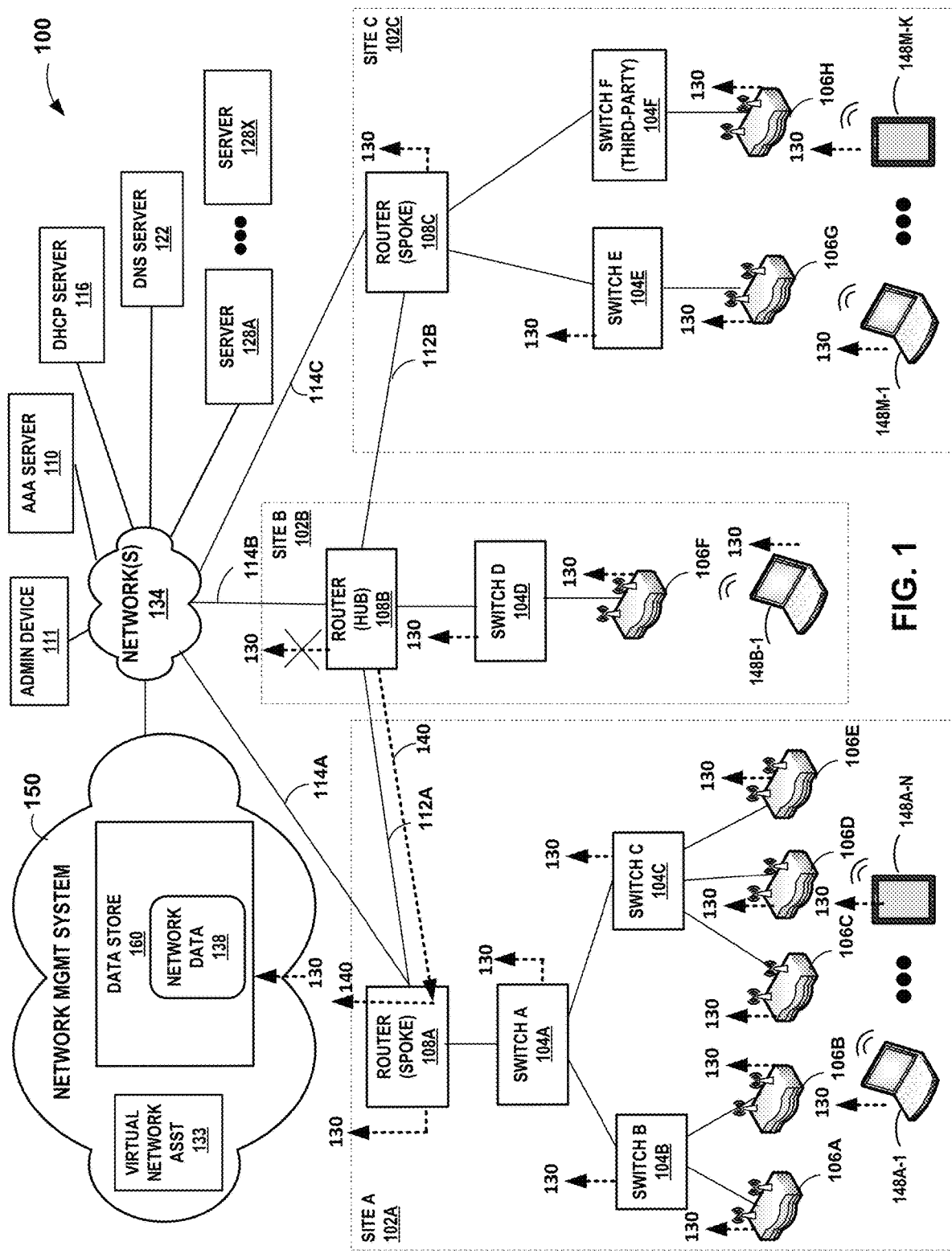
FIG. 1 is a block diagram of an example network system, in accordance with one or more techniques of the disclosure.

Conventionally, a network device, such as a router or switch, collects and sends telemetry data (also referred to herein as "control data"), including cloud connectivity status and assurance data, to a WAN assurance system, e.g., via a socket connection from the network device to the WAN assurance system along a WAN path. In some examples, the telemetry data includes data about the health of the network device, such as CPU, memory, and/or utilization levels. In some examples, the telemetry data may be periodically-reported data or event-driven data. In some examples, the network device executes a WAN assurance software agent which receives configuration from the WAN assurance system, collects telemetry data, and reports the telemetry data to the WAN assurance system. For example, the network device may be configured to collect statistics and/or sample other types of data. In some examples, the WAN assurance software agent executed by the network device may periodically create a package of the statistical data and report this package of data to the WAN assurance system. The WAN assurance system collects such telemetry data from a plurality of network devices within a network and analyzes such data to perform WAN assurance operations, such as traffic engineering, path selection, network device management, and detection, troubleshooting, and remediation of adverse network events.

In some circumstances, the network device may experience an issue with communicating with the WAN assurance system. For example, a network device may experience an issue with communicating with the WAN assurance system due to performance degradation or failure of a WAN interface of the network device, a WAN assurance or NMS software agent executed by the network device to communicate with the WAN assurance system, or another device or link along the WAN path to the WAN assurance system, due to expired or untrusted security certificates, or due to other circumstances not expressly described herein. If a WAN interface of a conventional network device experiences performance degradation or fails, the network device may attempt to use other WAN interfaces of the first network device to forward the telemetry data so as to enable the WAN assurance system to continue WAN management and assurance operations. However, if performance degradation or failure occurs along the WAN path to the WAN assurance system, the network device may no longer be manageable and may be stranded. Such failures may occur due to failures of other devices along the WAN path, the WAN assurance software agent executed by the network device, broken trust certificates or invalid security credentials of the network device, etc.

Techniques are disclosed herein for enabling recovery of the network device and maintaining management by the WAN assurance system. As described herein, if a first network device is unable to send telemetry data to the WAN assurance system, the first network device may use a designated network device to report diagnostics data (also referred to herein as "critical data" or "distress data"), such as connectivity loss of the first network device to the WAN assurance system. In some examples, the diagnostics data includes connectivity status information indicating: a type of the issue or reason the first network device is unable to communicate with the WAN assurance platform (e.g., due to performance degradation or failure of an interface, a path, a software agent of the first network device, a certificate or security error, etc.); system status of the first network device (e.g., a version of hardware or software of the first network device, resource utilization statistics, etc.); a time the issue occurred; an identification of one or more interfaces of the first network device associated with the issue; and/or critical system events and alarms.

In some examples, there is a direct connection between the first network device and peer network device such that the two periodically exchange keep-alive packets to maintain (or "keep alive") the connection between the two devices. In such an example, the first network device may include the diagnostics data as metadata added to a keep-alive packet sent to the peer network device along a peer path different from the WAN path between the first network device and the WAN assurance system. In some examples, at any given point in time, each network device knows about the cloud connectivity status of each other network device. A peer network device that receives the diagnostics data, such as summary of status, alarms, and events, may then forward the diagnostics data for the first network device to the WAN assurance system.

In another example of the techniques of the disclosure, the first network device may be connected to multiple peer network devices. The first network device may select one of the peer network devices to forward the diagnostics data to the WAN assurance system in a way that does not overwhelm a particular peer. In this example, each network device may compute a Peer Cloud Connectivity (PCC) score for itself and communicate its score with each other peer network device. Upon the first network device experiencing an issue with sending telemetry data to the WAN assurance system, the first network device may use the PCC scores of peer network devices to select a peer network device for forwarding the diagnostics data. In some examples, a network device computes its PCC score based on a robustness, stability, and/or a reliability of a connection of the network device to the WAN assurance system and/or peer network devices. For example, the network device may compute its PCC score based on: 1) the connectivity of the network device to the WAN assurance system over a previous time interval (e.g., 24 hours); 2) a round trip time between the network device and the WAN assurance system; 3) one or more characteristics of the path or link between the network device and a peer network device (e.g., such as a Bidirectional Forwarding Detection (BFD) Mean Opinion Score (MOS) score); and 4) an amount of data exchanged between the network device and the WAN assurance system. In some examples, the first network device may positively weight its PCC score based on: 1) the connectivity of the network device to the WAN assurance system over a previous time interval; and 3) one or more characteristics of the path or link between the network device and a peer network device. In further examples, the first network device may negatively weight its PCC score based on: 2) a round trip time between the network device and the WAN assurance system; and 4) an amount of data exchanged between the network device and the WAN assurance system.

In some examples, after a second network device is selected as a peer for forwarding diagnostics data on behalf of a first network device experiencing an issue communicating with the WAN assurance system, the second network device may recompute its PCC score to account for the additional data exchanged with the WAN assurance system. This may cause the PCC score of the second network device to change such that another network device may be selected as a peer for forwarding diagnostics data on behalf of another failed network device, thereby preventing any particular network device from becoming overcongested due to the reporting of diagnostics data of other network devices.

In some examples, a second network device selected as a peer for forwarding diagnostics data on behalf of a failed first network device may itself lack connectivity to the WAN assurance system. In such an example, the second network device may use the PCC score of its peers to select a third network device for forwarding diagnostics data for both the first network device and the second network device to the WAN assurance platform. Furthermore, the first and second network devices may modify their own PCC to reflect a lack of connectivity to the WAN assurance platform so as to avoid loops.

The WAN assurance system may use the diagnostics data received from the peer network device to perform diagnostics, troubleshooting, corrective maintenance, and remediation of the first network device via the peer network device. For example, the first network device may be unable to forward telemetry data to the WAN assurance system due to an issue with a WAN assurance software agent executed by the first network device, such as may be caused by performance degradation or failure of the software agent. Upon receiving the diagnostics data from the peer network device, the WAN assurance system may cause the peer network device to restart the WAN assurance software agent executed by the first network device, reboot the first network device, or reinstall, upgrade, or downgrade the WAN assurance software agent executed by the first network device.

FIG. 1 is a block diagram of an example network system 100 in which a network management system (NMS) 150 automatically detects, troubleshoots, and remediates network events having a problematic user impact, according to one or more techniques of the disclosure. In some examples, NMS 150 is an example of a WAN assurance system. In some examples, NMS 150 is an example of a cloud-based WAN assurance system. In the example shown in FIG. 1, an organization includes three sites 102A-102C arranged in a "hub and spoke" architecture, with site 102B being the hub site and sites 102A and 102C being spoke sites. As an example, the organization may be a large corporation with multiple campuses, where each campus may be a site. Generally speaking, a site may refer to a geographic location. The organization may have sites in different cities, sites that are different campuses within a city, sites that are different buildings within a campus, etc. In some examples, network topologies other than hub and spoke may be used. For example, the network may be a partial mesh topology, a full mesh topology, or other network topology. Further, the network topology may be a hybrid topology. For example, the hubs and sites may be arranged in a hub and spoke topology while internal to a site, the network may have a mesh topology.

Network system 100 also includes switches 104A-104F (collectively "switches 104") and access points (APs) 106A-106H. Each AP 106 may be any type of wireless access point, including, but not limited to, a commercial or organization AP, a wireless router, or any other device capable of providing wireless network access.

Site 102B includes router 108B which is configured as a hub router. Router 108B is configured to communicate with router 108A at site 102A via wide area network (WAN) link 112A, where router 108A is configured as a spoke router. Router 108B is configured to communicate with router 108C at site 102C via WAN link 112B, where router 108C is configured as a spoke router. Further, router 108B is configured to communicate with network 134. Router 108B is also configured to communicate with switch 104D, which is configured to communicate with AP 106F.

In addition to router 108A, site 102A includes switch 104A that is communicatively coupled to switches 104B and 104C. Switch 104B is communicatively coupled to APs 106A and 106B. Switch 104C is communicatively coupled to APs 106C-106E.

In addition to router 108C, site 102C includes switches 104E and 104F. Switch 104E is communicatively coupled to AP 106G and switch 104F is communicatively coupled to AP 106H.

Various client devices 148 may be communicatively coupled to the APs 106, as shown in FIG. 1. Client devices 148 may also be referred to as "user equipment devices" (UEs) and/or "user devices." For example, client devices 148A-1-148A-N ("client devices 148A") are currently located at site 102A. Client devices 148B-1 is currently located at site 102B. Similarly, a plurality of client devices 148M-1 through 148M-K are currently located at site 102C. A client device 148 of an access point may be any type of wireless client device, including, but not limited to, a mobile device such as a smart phone, tablet or laptop computer, a personal digital assistant (PDA), a wireless terminal, a smart watch, smart ring or other wearable device. A client device 148 may also be an IoT device such as a printer, security device, environmental sensor, or any other device configured to communicate over one or more wireless networks.

Example network system 100 also includes various networking components for providing networking services within the wired network including, as examples, an Authentication, Authorization and Accounting (AAA) server 110 for authenticating users and/or client devices, a Dynamic Host Configuration Protocol (DHCP) server 116 for dynamically assigning network addresses (e.g., IP addresses) to client devices upon authentication, a Domain Name System (DNS) server 122 for resolving domain names into network addresses, a plurality of servers 128 (e.g., web servers, database servers, file servers) and the like.

During operation, devices in network system 100 may collect and communicate telemetry data 130 to NMS 150. Telemetry data 130 may vary depending on the type of device providing the information and whether or not the device is configured to provide telemetry data. NMS 150 can store the received telemetry data 130, along with other data about network system 100, as network data 138. NMS 150 may obtain telemetry data 130 using a "push" model or a "pull" model. In a pull model, NMS 150 may poll network devices in network system 100 and request that the network devices send their respective telemetry data 130 to NMS 150. In a push model, the various network devices of network system 100 periodically send telemetry data 130 to NMS 150 without NMS 150 having to request telemetry data 130.

In some aspects, AP 106 may provide AP telemetry data that includes information regarding AP connectivity to other network devices. For example, the AP telemetry data may include data identifying the number of client devices 148 connected to the AP and a switch connected to the AP. In some aspects, an AP 106 may provide Link Layer Discovery Protocol (LLDP) data as part of telemetry data 130. Link Layer Discovery Protocol (LLDP) is a layer 2 neighbor discovery protocol that allows devices to advertise device information to their directly connected peers/neighbors. An AP 106 may provide LLDP data to identify a wired connection to a switch.

AP 106 may also report information on client devices 148 connected to the AP. In some aspects, NMS 150 may treat information about client devices received from an AP as a separate source from the AP, e.g., NMS 150 treats the client information as if it came from the client device rather than the AP device. Clients and client connectivity data have relatively high volume compared to other entities in the network. In some aspects, an AP may periodically report telemetry data to NMS 150 (e.g., every minute).

Similarly, a switch 104 may provide AP telemetry data regarding connectivity to an AP 106. Switches 104 may also provide switch telemetry data regarding connectivity to other switches, routers, gateways etc. In some aspects, switches 104 may provide LLDP data identifying the switch reporting the LLDP data and identifying devices connected to ports of the switch and the types of ports.

Other devices such as routers and gateways may also provide telemetry data such as LLDP data. Additionally, gateway devices (e.g., routers 108) may report both wired connections and virtual or logical connections. A given network device may establish multiple logical paths (e.g., peer paths or tunnels) over a WAN with multiple other network devices on a single physical interface. Each of the network devices may include a software agent or other module configured to report path data collected at a logical path level to NMS 150 in the cloud and/or the path data may be retrieved from the network devices by NMS 150 via an application programming interface (API) or protocol. In some aspects, the telemetry data may include labels identifying the network device as a hub or data center router. In some aspects, the telemetry data may identify the router as a spoke router (e.g., a branch office router).

In examples where routers 108 include session-based routers, a given session-based router may establish multiple peer paths over the WAN with multiple other session-based routers on a single physical interface. Each of the session-based routers may include a software agent embedded in the session-based router configured to report the path data collected at a peer path level to the NMS in the cloud. In examples where the network devices comprise packet-based routers, a given packet-based router may establish multiple tunnels over the WAN with multiple other packet-based routers on a single physical interface. Each of the packet-based routers may collect data at a tunnel level, and the tunnel data may include the tunnel data as part of telemetry data 130 reported to NMS 150.

Routers 108 may also report network session data such as session flow data. Session flow data can include source and destination client IP addresses and session duration for a network session between two network devices.

In some examples, network devices 104, 108 employ a stateful, session-based routing scheme that enables each network devices 104, 108 to independently perform path selection and traffic engineering. In some examples, routers 108 are session aware SD-WAN routers. The use of session-based routing may enable network devices 104, 108 to eschew the use of a centralized controller, such as a Software-Defined Networking (SDN) controller to perform path selection and traffic engineering. In this way, network devices 104, 108 may be more efficient and scalable for large networks where the use of an SDN controller would be infeasible. Furthermore, the use of session-based routing may enable network devices 104, 108 to eschew the use of tunnels, thereby saving considerable network resources by obviating the need to perform encapsulation and decapsulation at tunnel endpoints. In some examples, network devices 104, 108 implement session-based routing as Secure Vector Routing (SVR).

As described herein, a network session (also referred to herein as a "session") includes a forward packet flow originating from a first device and destinated for a second device and/or a reverse packet flow originating from the second device and destined for the first device. The session may be bidirectional in that the session may include packets travelling in both directions (e.g., a forward packet flow and a reverse packet flow) between the first and second devices.

Additional information with respect to session-based routing and SVR is described in U.S. Pat. No. 9,729,439, entitled "COMPUTER NETWORK PACKET FLOW CONTROLLER," and issued on Aug. 8, 2017; U.S. Pat. No. 9,729,682, entitled "NETWORK DEVICE AND METHOD FOR PROCESSING A SESSION USING A PACKET SIGNATURE," and issued on Aug. 8, 2017; U.S. Pat. No. 9,762,485, entitled "NETWORK PACKET FLOW CONTROLLER WITH EXTENDED SESSION MANAGEMENT," and issued on Sep. 12, 2017; U.S. Pat. No. 9,871,748, entitled "ROUTER WITH OPTIMIZED STATISTICAL FUNCTIONALITY," and issued on Jan. 16, 2018; U.S. Pat. No. 9,985,883, entitled "NAME-BASED ROUTING SYSTEM AND METHOD," and issued on May 29, 2018; U.S. Pat. No. 10,200,264, entitled "LINK STATUS MONITORING BASED ON PACKET LOSS DETECTION," and issued on Feb. 5, 2019; U.S. Pat. No. 10,277,506, entitled "STATEFUL LOAD BALANCING IN A STATELESS NETWORK," and issued on Apr. 30, 2019; and U.S. Pat. No. 10,432,522, entitled "NETWORK PACKET FLOW CONTROLLER WITH EXTENDED SESSION MANAGEMENT," and issued on Oct. 1, 2019; and U.S. Patent Application Publication No. 2020/0403890, entitled "IN-LINE PERFORMANCE MONITORING," published on Dec. 24, 2020, the entire content of each of which is incorporated herein by reference in its entirety.

In the example of FIG. 1, network management system (NMS) 150 can receive telemetry data 130 and user impact data 137. In this example, NMS 150 can be a cloud-based computing platform that implements various techniques of the disclosure.

Virtual network assistant 133 may be a network analysis application, a network management application, a network reporting application, a network visualization application, a network troubleshooting application and the like.

In some implementations, some or all of routers 108, switches 104, and APs 106 may be from the same manufacturer, or may provide telemetry data 130 that conforms to a format or protocol that is known to NMS 150. However, it may be the case that some network devices in network system 100 do not provide telemetry data 130, or do not provide data according to format or protocol known to NMS 150. Such network devices may be referred to as third-party network devices. For instance, in the example illustrated in FIG. 1, switch 104F does not provide telemetry data 130 to NMS 150 and is thus a third-party network device. In such cases, NMS 150 can use techniques to infer the existence of devices like switch 104F that do not provide telemetry data 130. In the example of FIG. 1, AP 106H is connected to third-party switch 104F and does report telemetry data 130. Additionally, router 108C is connected to third-party switch 104F and reports telemetry data 130. NMS 150 may use telemetry data from router 108C and/or AP 106H to infer the existence of switch 104F and connection properties of switch 104F even though switch 104F itself may not report such information.

As shown in FIG. 1, the various devices and systems of network system 100 are coupled together via one or more network(s) 134, e.g., the Internet and/or an enterprise intranet. Each one of the servers 110, 116, 122, 128, switches 104, routers 108, APs 106, NMS 150, and any other servers or devices attached to or forming part of network system 100 may include a system log or an error log module wherein each one of these devices records the status of the device including normal operational status and error conditions.

In the example of FIG. 1, NMS 150 is a cloud-based computing platform that manages networks and network devices at one or more of sites 102A-102C. In accordance with one specific implementation, a computing device is part of NMS 150. In accordance with other implementations, NMS 150 may comprise one or more computing devices, dedicated servers, virtual machines, containers, services, or other forms of environments for performing the techniques described herein. Similarly, computational resources and components implementing VNA 133 may be part of the NMS 150, may execute on other servers or execution environments, or may be distributed to nodes within network 134 (e.g., routers, switches, controllers, gateways, and the like).

In some examples, telemetry data 130 may represent "overhead traffic" data. Overhead traffic data may include data that is not present in client application data. Telemetry data 130 may, in some examples, represent network climate data that is different from network data 138. Telemetry data 130 may, in some examples, indicate network activity that causes an adverse user impact. In some examples, telemetry data 130 may represent a category of data that is separate from network data 138. For example, telemetry data 130 may include information sent to NMS 150 specifically for the purpose of monitoring network system 100, whereas network data 138 includes network traffic sent for the purpose of operating network system 100. That is, NMS 150 may use telemetry data 130 for monitoring the network rather than configuring one or more devices within the network.

In some examples, NMS 150 may receive telemetry data 130 directly from one or more devices within network system 100. For example each client device of client devices 148 may output telemetry data directly to NMS 150, each AP of APs 106 may output telemetry data directly to NMS 150, each switch of switches 104 may output telemetry data directly to NMS 150, and each network device of routers 108 may output telemetry data directly to NMS 150. The telemetry data 130 received by NMS 150 may include telemetry data from any one or combination of devices of switches 104, APs 106, routers 108, and client devices 148.

In some examples, each device within switches 104, APs 106, routers 108, and client devices 148 may form a secure connection between the respective device and NMS 150. In some examples, each secure connection may include a socket (e.g., an HTTPS kernel). This may allow each device of switches 104, APs 106, routers 108, and client devices 148 may send telemetry data to NMS 150 in a manner that is secure.

In some examples, a client device of client devices 148 may communicate directly with NMS 150 when the client device downloads a software development kit (SDK). The SDK may enable the client device of client devices 148 to send telemetry data 130 and/or user impact data 137 directly to NMS 150, e.g., via an API, without sending the data via switches 104, APs 106, and/or routers 108.

In some examples, NMS 150 monitors network data 138 such as telemetry data 130 associated with networks and network devices at each site 102A-102C, respectively, and manages network resources, such as routers 108, switches 104, and/or APs 106 at each site, to deliver a high-quality networking experience to end users, IoT devices and clients at the site. The telemetry data received by NMS 150 may be stored in a data store 160 as network data 138. In some examples, NMS 150 may use network data 138 to determine a network topology.

In some examples, client management traffic may compete with user application traffic, such that client management traffic and user application traffic both flow through one or more network devices of network system 100. In some examples, NMS 150 may analyze user application traffic from each hop of one or more hops within network system 100 that passes user application traffic, such as devices that carry a specific application session. NMS 150 may generate a topology of the network devices and connections between the network devices that were involved in the particular application session over a duration of the particular application session Such an NMS is described in further detail in U.S. application Ser. No. 17/935,704, filed Sep. 27, 2022, entitled "APPLICATION SESSION-SPECIFIC NETWORK TOPOLOGY GENERATION FOR TROUBLESHOOTING THE APPLICATION SESSION," the entire contents of which are incorporated by reference herein. The application-session specific topology is built based on telemetry data received from the network devices, e.g., client devices, AP devices, switches, and other network nodes such as routers, over the duration of the particular application session.

In some examples, NMS 150 may analyze the proportion of user application traffic at each hop of the one or more hops along an application session path relative to the proportion of user application at each other hop (node) of the one or more hops. In some examples, NMS 150 may analyze user application traffic at each layer of one or more layers of network system 10. For example, NMS 150 may include one or more Layer 2 network devices and/or one or more Layer 3 network devices.

In general, NMS 150 may provide a cloud-based platform for network data acquisition, monitoring, activity logging, reporting, predictive analytics, network anomaly identification, invoking remedial actions, and alert generation. For example, NMS 150 may include a virtual network assistant (VNA) 133 that analyzes network data 138, provides real-time insights and simplified troubleshooting for IT operations, and automatically takes corrective action or provides recommendations to proactively address various wired and wireless network issues. VNA 133 may, for example, include a network data processing platform configured to process hundreds or thousands of concurrent streams of network data from sensors and/or agents associated various devices in network system 100 (e.g., routers 108, switches 104, and/or APs 106) and/or nodes within network 134. VNA 133 may provide real-time alerting and reporting to notify administrators of any predicted events, anomalies, trends, and may perform root cause analysis and automated or assisted error remediation.

In some examples, VNA 133 of NMS 150 may apply machine learning techniques to identify the root cause of network issues detected or predicted from the streams of event data. For example, in some aspects, VNA 133 may utilize a machine learning model that has been trained using either supervised or unsupervised machine learning techniques to identify the root cause of error conditions within the network. VNA 133 may generate a notification indicative of the root cause and/or one or more corrective or remedial actions that may be taken to address the root cause of the network issues. If the root cause may be automatically resolved, VNA 133 can automatically invoke one or more corrective actions to correct the root cause of the network issues.

Example details of these and other operations implemented by the VNA 133 and/or NMS 150 are described in U.S. application Ser. No. 14/788,489, filed Jun. 30, 2015, and entitled "Monitoring Wireless Access Point Events," U.S. application Ser. No. 16/835,757, filed Mar. 31, 2020, and entitled "Network System Fault Resolution Using a Machine Learning Model," U.S. application Ser. No. 16/279,243, filed Feb. 19, 2019, and entitled "Systems and Methods for a Virtual Network Assistant," U.S. application Ser. No. 16/237,677, filed Dec. 31, 2018, and entitled "Methods and Apparatus for Facilitating Fault Detection and/or Predictive Fault Detection," U.S. application Ser. No. 16/251,942, filed Jan. 18, 2019, and entitled "Method for Spatio-Temporal Modeling," U.S. application Ser. No. 16/296,902, filed Mar. 8, 2019, and entitled "Method for Conveying AP Error Codes Over BLE Advertisements," and U.S. application Ser. No. 17/303,222, filed May 24, 2021, and entitled, "Virtual Network Assistant Having Proactive Analytics and Correlation Engine Using Unsupervised ML Model," all of which are incorporated herein by reference in their respective entireties.

In operation, NMS 150 observes, collects and/or receives telemetry data 130 and stores the telemetry data 130 as part of network data 138. The network data is indicative of one or more aspects of wired or wireless network performance. Network data 138 may take the form of data extracted from messages, counters and statistics, for example. The network data may be collected and/or measured by one or more network devices (e.g., routers 108, switches 104, APs 106 etc.) in a wired or wireless network of a site 102. Some of the network data may be collected and/or measured by other devices in the network system 100. In accordance with one example implementation, a processor or computing device is part of the network management system 150. In accordance with other implementations, NMS 150 may comprise one or more processors, processing circuitry, computing devices, dedicated servers, virtual machines, containers, services or other forms of environments for performing the techniques described herein. Similarly, computational resources and components implementing VNA 133 may be part of the NMS 150, may execute on other servers or execution environments, or may be distributed to nodes within network system 100 (e.g., routers, switches, controllers, gateways, and the like).

NMS 150 can detect that a network is experiencing adverse network events causing a problematic or negative user impact on users of a client device. In response to detecting adverse network events, NMS 150 can determine a root cause of the adverse network events. For example, NMS 150 can process network data 138 using a machine learning model trained to determine root causes of adverse network events based on network data 138. Upon determining the root cause of the adverse network events, NMS 150 can determine remedial actions to remediate the adverse network events. In some aspects, NMS 150 can send instructions to perform the remedial actions to a neighbor network device of an offending network device.

Although the techniques of the present disclosure are described in this example as being performed by NMS 150, techniques described herein may be performed by any other computing device(s), system(s), and/or server(s), and that the disclosure is not limited in this respect. For example, one or more computing device(s) configured to execute the functionality of the techniques of the disclosure may reside in a dedicated server or be included in any other server (such as any of servers 128A-128N) in addition to or other than NMS 150, or may be distributed throughout network system 100, and may or may not form a part of NMS 150.

FIG. 1 has shown an example network system 100 having three sites 102. A network system may have fewer or more sites than those illustrated in FIG. 1. Additionally, sites may have a fewer or greater number network devices such as routers 108, switches 104 and APs 106 than those shown in FIG. 1.

In some examples, NMS 150 is configured to operate according to an artificial intelligence/machine-learning-based computing platform providing troubleshooting and automatic remediation of user-impacting network issues identified by NMS 150. In general, the VNA operates according to phases. In a first phase of operation, the VNA monitors network traffic and characteristics as well as collected data indicative of user impact, and applies ML models to detect and correlate indicators indicative of the presence of a network loop. In a second phase of operation, the VNA performs root cause analysis and remediation of adverse network events. Additional information with respect to the VNA is described in U.S. patent application Ser. No. 17/812,676, entitled "DETECTING NETWORK EVENTS HAVING ADVERSE USER IMPACT," filed Jul. 14, 2022, the entire content of which is incorporated herein by reference in its entirety.

As discussed above, a network device, such one of routers 108 and switches 104, collects and sends telemetry data 130, including cloud connectivity status and assurance data, to NMS 150, e.g., via path 114A. If the network device loses connectivity to NMS 150, such as if performance degradation or failure occurs along path 114A, the network device may no longer be manageable and may be stranded. Such issues may occur due to performance degradation or failure of other devices along the WAN path, the WAN assurance software agent executed by the network device, broken trust certificates or invalid security credentials of the network device, etc.

In accordance with the techniques of the disclosure, a network device, such as routers 108 and switches 104, may report diagnostics data 140 to NMS 150, in response to the network device detecting a communication issue with NMS 150. For example, router 108B periodically sends telemetry data 130 to NMS 150 over path 114B. Telemetry data 130 may provide information on various statistics and metrics for router 108B. Telemetry data 130 may be sent by router 108B on a periodic time interval, e.g., about every 30 seconds. Additionally, NMS 150 and router 108B may exchange a heartbeat message on a periodic time interval. A failure by NMS 150 to receive telemetry data 130, or a failure by router 108B or NMS 150 to receive the heartbeat message from the other may indicate that router 108B has lost connectivity with NMS 150 due to an error, such as a failed interface or path, etc. In some examples, router 108B and NMS 150 exchange a heartbeat message about every 30 seconds. In some examples, telemetry data 130 sent by router 108B includes short-form statistics (also referred to as "minimal statistics") or long-form statistics (also referred to as "full statistics") for router 108B, peer network devices connected to router 108B, and network links and paths to which router 108B is connected. Additional description of the short-form statistics and long-form statistics is set forth below.

In the example of FIG. 1, router 108B detects an issue with sending telemetry data 130 to NMS 150 via path 114B.

In response to detecting the issue, router 108B sends diagnostics data 140 to router 108A along path 112A. Typically, router 108A is a peer of router 108B and also possesses a functional communication path (e.g., path 114A) to NMS 150. In some examples, path 114B may be, e.g., a WAN communication path such as an LTE path. Path 112A between router 108A and router 108B may be, for example, a LAN communication path, such as an Ethernet or broadband path. Diagnostics data 140 may include information describing the issue with sending telemetry data 130 to NMS 150 via path 114B. Router 108A forwards diagnostics data 140 to NMS 150 to aid NMS 150 in troubleshooting and remediating the issue experienced by router 108B.

In some examples, router 108B selects router 108A from a plurality of other network devices 104, 108 to receive diagnostics data 140 of router 108B. For instance, each network device 104, 108 computes a score indicative of a reliability of the respective network device 104, 108 to receive and forward diagnostics data to NMS 150. Each network device 104, 108 may periodically compute its own score and share this score with peer network devices 104, 108. Two network devices may be considered peers where the network devices share a common link, where the network devices are adjacent to one another, or where the network devices are one "hop" distant from one another. For example, as depicted in FIG. 1, router 108A, switch 104D, and router 108C are peers of router 108B. As another example, and with further reference to FIG. 1, switch 104A and router 108B are peers of router 108A, while switch 104B, switch 104C, and router 108A are peers of switch 104Ae. With respect to the foregoing example, upon detecting the issue with sending telemetry data 130 to NMS 150 via path 114B, router 108B may use the respective scores of peer routers 108A and 108C to select router 108A to receive diagnostics data 140 for router 108B.

In some examples, upon receiving diagnostics data 140 for router 108B, NMS 150 may use peer router 108A to perform troubleshooting, remediation, or repair of router 108B. For example, NMS 150 may use diagnostics data 140 for router 108B to identify a root cause of the issue with sending telemetry data 130 to NMS 150 via path 114B. NMS 150 may subsequently perform a corrective action to address the root cause. For example, NMS 150 may provide a software image to peer router 108A and cause peer router 108A to install the software image upon the failed router 108B. As another example, NMS 150 may cause peer router 108A to reboot the failed router 108B or restart a software application executed by router 108B.

Figure 2:
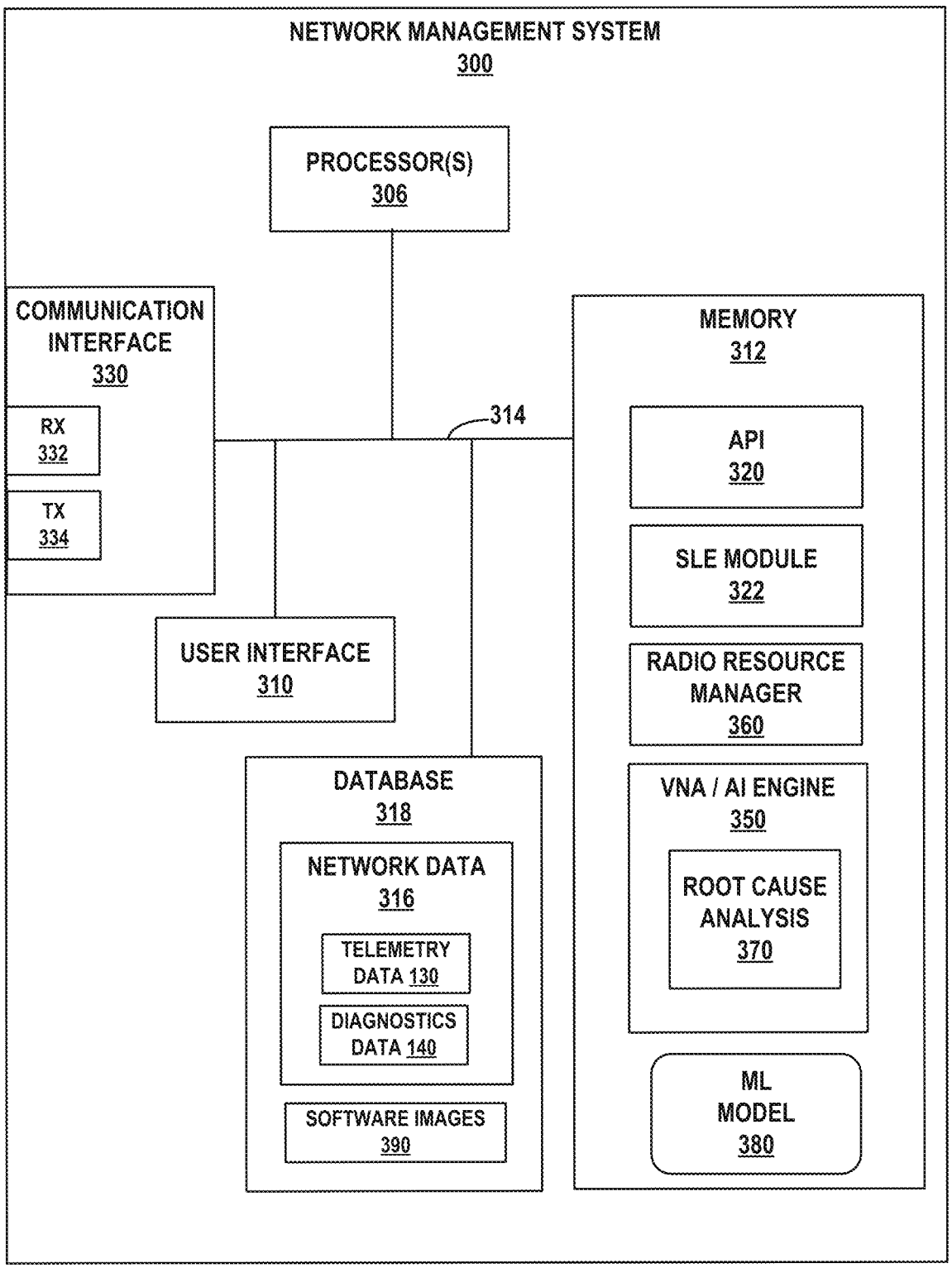
FIG. 2 is a block diagram of an example network management system, in accordance with one or more techniques of the disclosure.

FIG. 2 is a block diagram of an example network management system (NMS) 300 configured to operate in accordance with one or more techniques of the disclosure. NMS 300 may be used to implement, for example, NMS 150 in FIG. 1. In such examples, NMS 300 is responsible for monitoring and management of one or more networks at sites 102A-102C, respectively. In some examples, NMS 150 is an example of a cloud-based WAN assurance system.

NMS 300 includes a communications interface 330, one or more processor(s) 306, a user interface 310, a memory 312, and a database 318. The various elements are coupled together via a bus 314 over which the various elements may exchange data and information. In some examples, NMS 300 receives data from one or more of APs 106 (and their client devices 148), switches 104, routers 108 and other network nodes sites of 102A-102C of FIG. 1, which may be used to determine network connectivity, to calculate one or more SLE metrics and/or update network topology. NMS 300 analyzes this data for cloud-based management of the wired and wireless networks of sites 102A-102C. The received data, including telemetry data 130, is stored as network data 316 in database 318. In some examples, NMS 300 may be part of another server shown in FIG. 1 or a part of any other server.

Processor(s) 306 execute software instructions, such as those used to define a software or computer program, stored to a computer-readable storage medium (such as memory 312), such as non-transitory computer-readable mediums including a storage device (e.g., a disk drive, or an optical drive) or a memory (such as Flash memory or RAM) or any other type of volatile or non-volatile memory, that stores instructions to cause the one or more processors 306 to perform the techniques described herein.

Communications interface 330 may include, for example, an Ethernet interface. Communications interface 330 couples NMS 300 to a network and/or the Internet, such as any of network(s) 134 as shown in FIG. 1, and/or any local area networks. Communications interface 330 includes a receiver 332 and a transmitter 334 by which NMS 300 receives/transmits data and information to/from any of APs 106, switches 104. Routers 108, servers 110, 116, 122, 128 and/or any other network nodes, devices, or systems forming part of network system 100 such as shown in FIG. 1. In some scenarios described herein in which network system 100 includes "third-party" network devices that are owned and/or associated with different entities than NMS 300, NMS 300 does not receive, collect, or otherwise have access to network data from the third-party network devices.

The data and information received by NMS 300 may include, for example, telemetry data 130 (FIG. 1), diagnostics data 140 (FIG. 1), SLE-related data, or event data received from one or more of APs 106, switches 104, routers 108, or other network nodes used by NMS 300 to remotely monitor the performance of wired and wireless networks at sites 102A-102C. NMS 300 may further transmit data via communications interface 330 to any of network devices such as APs 106, switches 104, routers 108, other network nodes within the wired and wireless networks at sites 102A-102C, and/or admin device 111 to remotely manage the wired and wireless networks.

Memory 312 includes one or more devices configured to store programming modules and/or data associated with operation of NMS 300. For example, memory 312 may include a computer-readable storage medium, such as a non-transitory computer-readable medium including a storage device (e.g., a disk drive, or an optical drive) or a memory (such as Flash memory or RAM) or any other type of volatile or non-volatile memory, that stores instructions to cause the one or more processor(s) 306 to perform the techniques described herein.

In the example shown in FIG. 2, memory 312 includes an API 320, an SLE module 322, a virtual network assistant (VNA)/AI engine 350, and a radio resource management (RRM) engine 360. In some examples, network data 316 defines a series of network events of one or more event types over many observation time periods. VNA/AI engine 350 can apply a machine learning model such as ML model 380 to the network data to dynamically determine a baseline number of occurrences of the network events in the network for each of the event types over a time period and to classify, based on the baseline number of occurrences and subsequently received network data, the one or more network events as an abnormal network event indicative of abnormal network behavior. In some cases, VNA/AI engine 350 performs a time series trending analysis of the stored data. In some examples, VNA/AI engine 350 uses ML model 380 in applying trending analysis to identify trending behavior in network events over a time period to classify, based on the predicted counts and subsequently received network data, one or more network events as indicative of abnormal network behavior. In some examples, VNA/AI engine 350 applies trending analysis to identify trending behavior by performing time series pattern recognition to identify a start of the trending behavior. In some examples, VNA/AI engine 350 uses transferred learning information from a different network to dynamically determine a baseline number of occurrences of the network events, the transferred learning information including information about a number of occurrences of network events of one or more event types in the second network. NMS 300 may also include any other programmed modules, software engines and/or interfaces configured for remote monitoring and management of wired and wireless networks of sites 102A-102C, including remote monitoring and management of any of APs 106/200, switches 104, routers 108, or other network devices.

SLE module 322 enables set up and tracking of thresholds for SLE metrics for each wired and wireless networks at sites 102A-102C. SLE module 322 further analyzes SLE-related data collected by network devices, such as any of APs 106, switches 104, and routers 108. SLE module 322 may further analyze data from client devices in each wireless network of sites 102A-102C. This data is transmitted to NMS 300, which executes by SLE module 322 to determine one or more SLE metrics for APs 106, switches 104, and routers 108. This SLE data can be stored as, for example, network data 316 in database 318.

RRM engine 360 monitors one or more metrics for each site 102A-102N to learn and optimize the RF environment at each site. For example, RRM engine 360 may monitor the coverage and capacity SLE metrics for a wireless network at a site 102 to identify potential issues with SLE coverage and/or capacity in the wireless network and to make adjustments to the radio settings of the access points at each site to address the identified issues. For example, RRM engine may determine channel and transmit power distribution across all APs 106 in each wireless network at sites 102A-102C. For example, RRM engine 360 may monitor events, power, channel, bandwidth, and number of clients connected to each AP 106. RRM engine 360 may further automatically change or update configurations of one or more APs 106 at a site 102 with an aim to improve the coverage and capacity SLE metrics and thus to provide an improved wireless experience for the user.

VNA/AI engine 350 analyzes data received from network devices as well as its own data. In some aspects, a network device periodically reports telemetry data 130 and other network data to NMS 150 at a predetermined interval.

In accordance with the techniques of the disclosure, VNA/AI engine 350 includes root cause analysis 370, which may identify the root cause of issues preventing router 108A from sending telemetry data to the WAN assurance system. For example, as described above with respect to FIG. 1, a first router, such as router 108B of FIG. 1, detects an issue with sending telemetry data 130 to NMS 150 via a first path. In response to detecting the issue, the first router sends diagnostics data 140 to a second, peer router (such as router 108A of FIG. 1), which forwards diagnostics data 140 to NMS 150 via a second path. Upon receiving diagnostics data 140 for router 108B, root cause analysis 370 may use diagnostics data 140 to perform troubleshooting, remediation, or repair of router 108B.

In some examples, root cause analysis 370 may automatically invoke one or more corrective actions intended to address the identified root cause(s) of the issues preventing router 108A from sending telemetry data to the WAN assurance system. For example, and with respect to FIGS. 1 and 2, root cause analysis 370 may use diagnostics data 140 for router 108B to identify a root cause of the issue with sending telemetry data 130 to NMS 150 via path 114B. Additional description with regard to diagnostics data 140 is provided below. Upon identifying the root cause of the error, root cause analysis 370 may subsequently perform a corrective action to address the root cause via the peer router. For example, root cause analysis 370 may provide a software image to peer router 108A, and cause peer router 108A to install the software image upon the failed router 108B. As another example, root cause analysis 370 may cause peer router 108A to reboot the failed router 108B or restart a software application executed by router 108B.

For example, router 108B may experience a communication issue with NMS 150 due to performance degradation or failure of path 114B. NMS 150 may receive, from router 108B via router 108A, diagnostics data 140 indicating the performance degradation or failure of path 114A and a first interface of router 108B over which router 108B used to forward network traffic over path 114B. Using, at least in part, the information specified by diagnostics data 140, root cause analysis 370 may transmit, to peer router 108A, instructions causing failed router 108B to forward telemetry data 130 to NMS 150 along a different path via a different interface of failed router 108B.

In some situations, router 108B may experience a communication issue with NMS 150 due to performance degradation or failure of path 114B where remediation of router 108B may not be sufficient to remedy the communication issue. For example, the communication issue with NMS 150 due to performance degradation or failure of path 114B may occur, for example, if path 114B fails, a DNS service or DNS server fails, an IP address suffers a reachability issue, a connection is dropped or lost, or an SSL handshake fails (such as where a certificate expires or is not validated). In such an example, NMS 150 may receive diagnostics data 140 originating from a plurality of different routers 108, including, e.g., router 108B, as described herein. In this example, the device which needs remediation may be a device different than router 108B (with respect to the foregoing examples) or a device not included within the plurality of different routers 108 which send diagnostics data 140 to NMS 150. In this example, NMS 150 may use NMS 150 may use the diagnostics data 140 of the plurality of different routers 108 to identify the network device which needs remediation, as well as a peer of the network device which needs remediation. NMS 150 may transmit, to the peer device, the corrective action for application to the network device which needs remediation, as described herein, as well as receive, from the peer device, a report of the outcome of such corrective action applied to the network device which needs remediation.

As another example, router 108B may execute a WAN assurance or NMS software agent that is configured to send telemetry data 140 to NMS 150. In some events, router 108B may experience a communication issue with NMS 150 due to an issue with the WAN assurance or NMS software agent executed by router 108B, such as may be caused by performance degradation or failure of the NMS software agent. NMS 150 may receive, from router 108B via router 108A, diagnostics data 140 indicating the issue with the NMS software agent executed by router 108B and a version of the NMS software agent executed by router 108B. Using, at least in part, the information specified by diagnostics data 140, root cause analysis 370 may transmit, to peer router 108A, instructions causing failed router 108B to restart the NMS software agent or perform a reboot of the failed router 108B. In other examples, root cause analysis 370 may transmit, to peer router 108A, a software image or software update for the NMS software agent, and cause peer router 108A to reinstall, update, or upgrade the NMS software agent executed by the failed router 108B with the software image.

Additional examples of corrective actions that may be automatically invoked by root cause analysis 370 may include, but are not limited to, invoking RRM 360 to reboot one or more APs, adjusting/modifying the transmit power of a specific radio in a specific AP, adding SSID configuration to a specific AP, changing channels on an AP or a set of APs, etc. The corrective actions may further include restarting a switch and/or a router, invoking downloading of new software to an AP, switch, or router, etc. These corrective actions are given for example purposes only, and the disclosure is not limited in this respect. If automatic corrective actions are not available or do not adequately resolve the root cause, root cause analysis 370 may proactively provide a notification including recommended corrective actions to be taken by IT personnel, e.g., a site or network administrator using admin device 111, to address the network error.

In some examples, ML model 380 may comprise a ML model that is trained using supervised or unsupervised machine learning techniques applied to training data comprising pre-collected, labeled network data received from network devices (e.g., client devices, APs, switches and/or other network nodes), to identify root causes of network issues. ML model 380 may comprise one of a neural network, logistical regression, naïve Bayesian, support vector machine (SVM), or the like.

Although the techniques of the present disclosure are described in this example as performed by NMS 300, techniques described herein may be performed by any other computing device(s), system(s), and/or server(s), and that the disclosure is not limited in this respect. For example, one or more computing device(s) configured to execute the functionality of the techniques of this disclosure may reside in a dedicated server or be included in any other server in addition to or other than NMS 300, or may be distributed throughout network system 100, and may or may not form a part of NMS 300.

Figure 3:
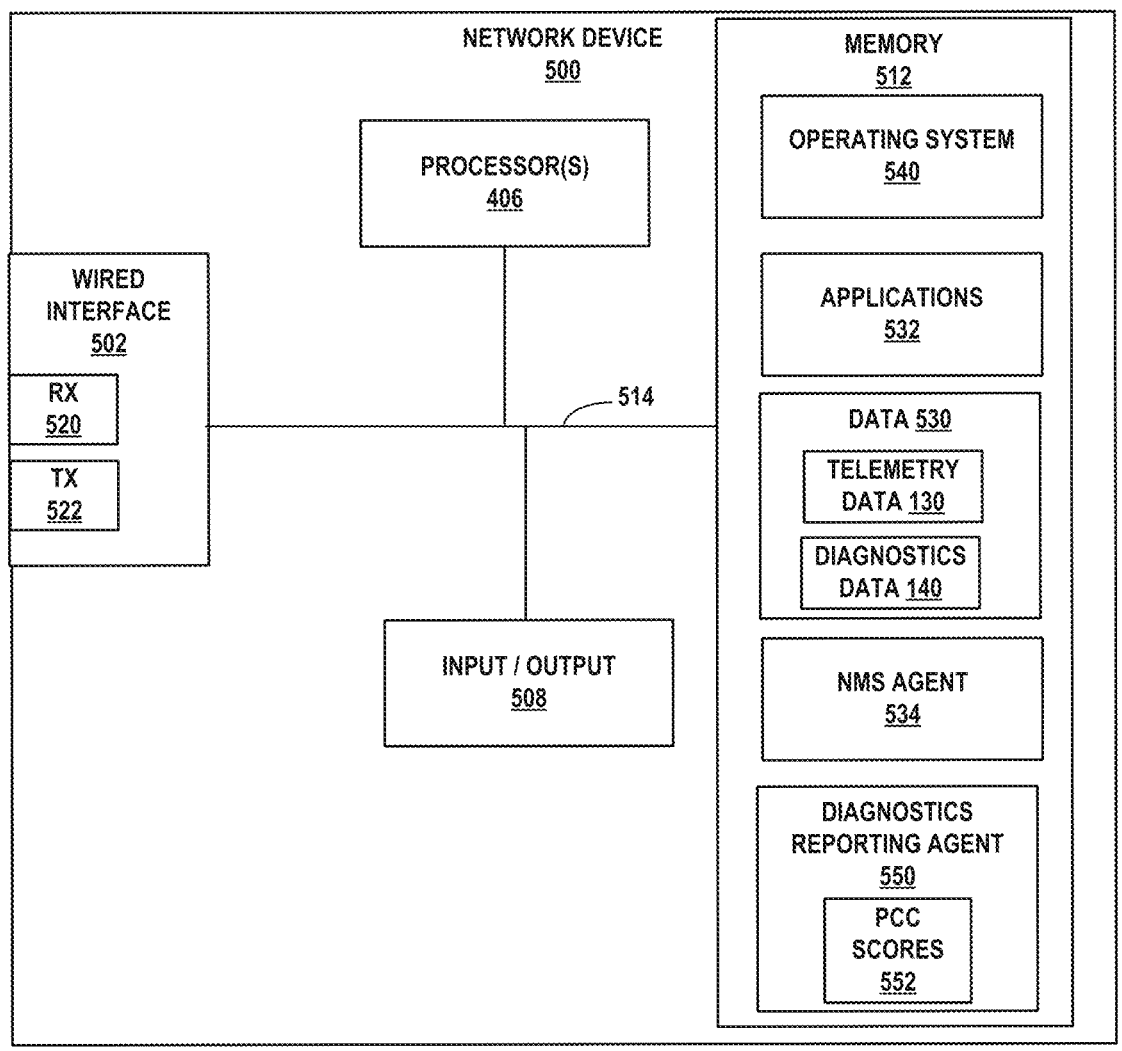
FIG. 3 is a block diagram of an example network device, in accordance with one or more techniques of the disclosure.

FIG. 3 is a block diagram illustrating an example network device 500 configured according to the techniques described herein. In one or more examples, network device 500 implements a device or a server attached to the network 134 of FIG. 1, e.g., routers 108, switches 104, AAA server 110, DHCP server 116, DNS server 122, VNA 133, Web server 128A-128X, etc., or a network device such as, e.g., routers, switches, gateways, APs, or the like.

In this example, network device 500 includes a communications interface 502, e.g., an Ethernet interface, a processor 506, input/output 508, e.g., display, buttons, keyboard, keypad, touch screen, mouse, etc., a memory 512 and an assembly of components 516, e.g., assembly of hardware module, e.g., assembly of circuits, coupled together via a bus 514 over which the various elements may interchange data and information. Communications interface 502 couples the network device 500 to a network, such as an enterprise network.

Though only one interface is shown by way of example, different types of network devices 500 may have multiple communication interfaces. Communications interface 502 includes a receiver 520 via which the network device 500 can receive data and information. Communications interface 502 includes a transmitter 522, via which the network device 500 can send data and information (e.g., including configuration information, authentication information, web page data, etc.).

In examples where network device 500 comprises a server, network device 500 may receive data and information, e.g., including operation related information, e.g., registration request, AAA services, DHCP requests, Simple Notification Service (SNS) look-ups, and Web page requests via receiver 520, and send data and information, e.g., including configuration information, authentication information, web page data, etc. via transmitter 522.

In examples where network device 500 comprises a wired network device, network device 500 may be connected via wired interface 502 to one or more APs or other wired client-side devices, e.g., switches, routers and/or IoT devices, within a wired network edge. For example, network device 500 may include multiple wired interfaces 502 and/or wired interface 502 may include multiple physical ports to connect to multiple APs or the other devices within a site via respective Ethernet cables. In some examples, each of the APs or other wired devices connected to network device 500 may access the wired network via wired interface 502 of network device 500. In some examples, one or more of the APs or other wired devices connected to network device 500 may each draw power from network device 500 via the respective Ethernet cable and a Power over Ethernet (PoE) port of wired interface 502.

Memory 512 stores executable software applications 532, operating system 540 and data/information 530. Data 530 includes system log and/or error log that stores network data and/or proximity information for device 500 and/or other devices, such as wireless access points, based on a logging level according to instructions from the network management system. In some examples, network data included in data 530 also may include network traffic impact data from network devices, for example, the packets dropped at certain switch ports due to congestion. Network device 500 may, in some examples, forward the network data to a network management system (e.g., NMS 150 of FIG. 1) for analysis as described herein.

NMS agent 534 is a software agent executed by network device 500 which performs WAN assurance operations for network device 500. NMS agent 534 may collect and communicate various data 530, such as telemetry data 140 and diagnostics data 150, to NMS 150 via an application programming interface (API) or protocol.

Telemetry data 130 may provide information on various statistics and metrics for network device 500. Telemetry data 130 may provide information on various statistics and metrics for network device 500. NMS agent 534 may receive telemetry data 130 from network device 500 on a periodic time interval. Additionally, NMS 150 and router 108B may exchange a heartbeat message on a periodic time interval, e.g., about every 30 seconds. A failure by NMS agent 534 to receive telemetry data 130 or the heartbeat message from network device 500 may indicate that network device 500 has lost connectivity with NMS 150 due to an error, such as a failed interface or path, etc. In some examples, network device 500 and NMS 150 exchange a heartbeat message about every 30 seconds.

Additionally, telemetry data 130 collected and reported by NMS agent 534 may include periodically-reported data and event-driven data. In some examples, NMS agent 534 is configured to collect statistics and/or sample other data according to a first periodic interval, e.g., every 3 seconds, every 4 seconds, etc. NMS agent 534 may store the collected and sampled data, e.g., in a buffer. In some examples, NMS agent 534 may periodically create a package of the statistical data according to a second periodic interval, e.g., every 3 minutes. In some examples, the package of statistical data may also include details about clients connected to network device 500. NMS agent 534 may then report the package of statistical data to NMS 150 in the cloud. In other examples, NMS 150 may request, retrieve, or otherwise receive the package of statistical data from network device 500 via an API, an open configuration protocol, or another of communication protocols. The package of statistical data created by NMS agent 534 or another module of network device 500 may include a header identifying network device 500 and the statistics and data samples for each of the logical paths from network device 500. In still other examples, NMS agent 534 reports event data to NMS 150 in the cloud in response to the occurrence of certain events at network device 500 as the events happen.

In some examples, telemetry data 130 sent by NMS agent 534 includes short-form statistics (also referred to as "minimal statistics") or long-form statistics (also referred to as "full statistics") for network device 500, peer network devices connected to network device 500, and network links and paths to which network device 500 is connected. The short-form statistics may include, e.g., statistics regarding a device identifier (ID), a Media Access Control (MAC) address, an organization ID, a site ID, and device specific data, such as a model, a type, or a hostname of network device 500. In some examples where network device 500 performs session-based routing, the short-form statistics may include a router name, a node name, a hardware model, high availability information, a high availability peer name, an asset ID, and versions of various software packages executed by network device 500. In some examples, the short-form statistics may include similar or different categories of information as described above.

The long-form statistics may include, e.g., the same information as the short-form statistics described above, and additionally may include much more detailed, granular, or verbose information, as well as information of various other types. For example, the long-form statistics may additionally include one or more of: various device fields, client data for one or more clients and client devices to which network device 500 is connected, Internet Protocol Security (IPsec) Security Associations (SA) statistics, WAN interface statistics, session-based routing peer path statistics, service status statistics, Dynamic Host Configuration Protocol (DHCP) statistics, as well as many additional categories of information not expressly described herein. In some examples, the long-form statistics may include similar or different categories of information as described above.

The short-form statistics may require less bandwidth or resources to transmit than the long-form statistics. Thus, NMS agent 534 may send short-form statistics to NMS 150 on a more frequent basis and may send long-form statistics to NMS 150 on a less frequent basis. For example, NMS agent 534 may send short-form statistics to NMS 150 about every 30 seconds. In some examples, NMS agent 534 may send long-form statistics to NMS 150 about every 3 minutes. In some examples, NMS agent 534 may send only short-form statistics, such as where network device 500 is not assigned to a site, or where NMS 150 disables reporting of long-form statistics. Alternatively or in addition, NMS agent 534 may send long-form statistics to NMS 150 in response to a request for such long-form statistics by NMS 150 or an administrator.

In accordance with the techniques of the disclosure, NMS agent 534 periodically receives telemetry data 130 from network device 500 over path 114B. Telemetry data 130 may provide information on various statistics and metrics for network device 500. Telemetry data 130 sent by network device 500, may, for example, include a heartbeat message to NMS agent 534 which network device 500 sends on a periodic time interval. A failure by NMS agent 534 to receive the heartbeat message may indicate to NMS agent 534 that network device 500 has lost connectivity with NMS 150 due to an error, such as a failed interface or path, etc. In some examples, network device 500 and NMS agent 534 exchange a heartbeat message about every 30 seconds. In some examples, telemetry data 130 sent by network device 500 includes short-form statistics (also referred to as "minimal statistics") or long-form statistics (also referred to as "full statistics") for network device 500, peer network devices connected to network device 500, and network links and paths to which network device 500 is connected.

In response to detecting a communication issue between network device 500 and with NMS 150, diagnostics reporting agent 550 may report diagnostics data 140 to NMS 150 via a peer network device. As described above, NMS agent 534 periodically sends telemetry data 130 to NMS 150 over a first path. In response to detecting the communication issue, diagnostics reporting agent 550 sends diagnostics data 140 to a second network device along a second path. The second network device may thereafter forward the diagnostics data 140 of network device 500 to NMS 150 for reporting, diagnosis, troubleshooting, and/or remediation of the issue experienced by network device 500. Typically, the second network device is a peer of network device 500 and also possesses a functional communication path to NMS 150. In some examples, the first path between network device 500 and NMS 150 may be, e.g., a WAN communication path such as an LTE path. In some examples, the second path between network device 500 and the peer network device may be, for example, a LAN communication path, such as an Ethernet or broadband path.

Diagnostics data 140 includes information describing the issue with sending telemetry data 130 to NMS 150 via the first path. For example, diagnostics data 140 may include one or more of a connectivity error type, a time at which network device 500 lost connectivity with NMS 150, a version of a WAN assurance or NMS software agent 534 executed by network device 500, and an interface used by network device 500 to send telemetry data 130. In some examples, diagnostics data 140 may include any troubleshooting analysis performed by network device 500 or a reason for the issue, such as information indicating one or more of an interface failure; a version mismatch between a software version of the WAN assurance or NMS software agent 534 executed by network device 500 and a software version executed by NMS 130; an expired or untrusted security certificate; a Network Address Translation (NAT) error; an identification of the issue experienced by network device 500; a time during which the issue occurred; or one or more types of network errors, to NMS 150 may use the information provided by diagnostics data 140 to identify a root cause of the issue with sending telemetry data to NMS 150, as described above.

In some examples, diagnostics reporting agent 550 selects a network device for forwarding diagnostics data 140 from a plurality of other network devices. Diagnostics reporting agent 550 may select the network device from other network devices based on a "peer cloud connectivity (PCC)" score for each peer network device that quantifies a performance and stability of a connection of the peer network device to NMS 150. For instance, diagnostics reporting agent 550 periodically computes a PCC score 552 of the connectivity of network device 500 to NMS 150, and forwards its PCC score to peer network devices. Similarly, each other network device periodically computes its own score of its respective connectivity to NMS 150 and shares this score with network device 500. Upon detecting the issue with sending telemetry data 130 to NMS 150 via the first path, diagnostics reporting agent 550 may use the respective PCC scores 552 of peer network devices to select a network device to receive diagnostics data 140 of network deice 500 for forwarding to NMS 150.

In some examples, diagnostics reporting agent 550 computes its PCC score based on one or more factors correlated with the stability and reliability of a connection between network device 500 and NMS 150 and/or a connection between network device 500 and peer network devices. For example, diagnostics reporting agent 550 may compute the PCC score of network device 500 based on: 1) the connectivity of the network device to the WAN assurance system over a previous time interval (e.g., 24 hours); 2) a round trip time between the network device and the WAN assurance system; 3) one or more characteristics of the path or link between the network device and a peer network device (e.g., such as a Bidirectional Forwarding Detection (BFD) Mean Opinion Score (MOS) score); and 4) an amount of data exchanged between the network device and the WAN assurance system.

In some examples, diagnostics reporting agent 550 computes its PCC score based on a connectivity of network device 500 to NMS 150 over a previous time interval. A higher amount of connectivity over the time interval may increase the desirability of network device 500 to act as a peer for forwarding diagnostics data on the behalf of other network devices to NMS 150.

As another example, diagnostics reporting agent 550 computes its PCC score based on a round-trip time between network device 500 and NMS 150. A higher round-trip time may decrease the desirability of network device 500 to act as a peer for forwarding diagnostics data on the behalf of other network devices to NMS 150.

As another example, diagnostics reporting agent 550 computes its PCC score based on one or more characteristics of the path between network device 500 and a peer network device. In some examples, the one or more characteristics may include a BFD MOS score of a link between network device 500 and a peer network device. A higher BFD MOS score may increase the desirability of network device 500 to act as a peer for forwarding diagnostics data on the behalf of other network devices to NMS 150.

As another example, diagnostics reporting agent 550 computes its PCC score based on an amount of data forwarded by network device 500 to NMS 150 over the previous time interval. A higher amount of data forwarded by network device 500 may decrease the desirability of network device 500 to act as a peer for forwarding diagnostics data on the behalf of other network devices to NMS 150.

In some examples, network device 500 may be configured, for example, to determine that a peer network device has present connectivity to NMS 150 prior to forwarding diagnostics data 140 to the peer network device. In some examples, network device 500 may determine that a peer network device has connectivity to NMS 150 based on the receipt, from the second network device, of an indication that the second network device has connectivity to NMS 150. Network device 500 may be configured, for example, to select a peer device from only those network devices that indicate present connectivity to NMS 150.

In some examples, network device 500 and a peer network device may exchange "keepalive" packets that indicate that a connection between the network device 500 and the peer network device is to remain open (e.g., is to be "kept alive"). In some examples, to send diagnostics data 140 to the selected peer network device, network device 500 modifies a keepalive packet to include diagnostics data 140 as metadata embedded within the keepalive packet, and forwards the modified keepalive packet to the selected peer network device. The peer network device, upon receiving a keepalive packet containing diagnostics data 140 as metadata, may be configured to forward diagnostics data 140 to NMS 150.

Additional information with respect to embedding diagnostics, metrics, and performance information within metadata is described in U.S. Patent Application Publication No. 2020/0403890, entitled "IN-LINE PERFORMANCE MONITORING," published on Dec. 24, 2020; and U.S. Pat. No. 10,200,264, entitled "LINK STATUS MONITORING BASED ON PACKET LOSS DETECTION," issued on Feb. 5, 2019, the entire content of each of which is incorporated herein by reference in its entirety.

Figure 4:
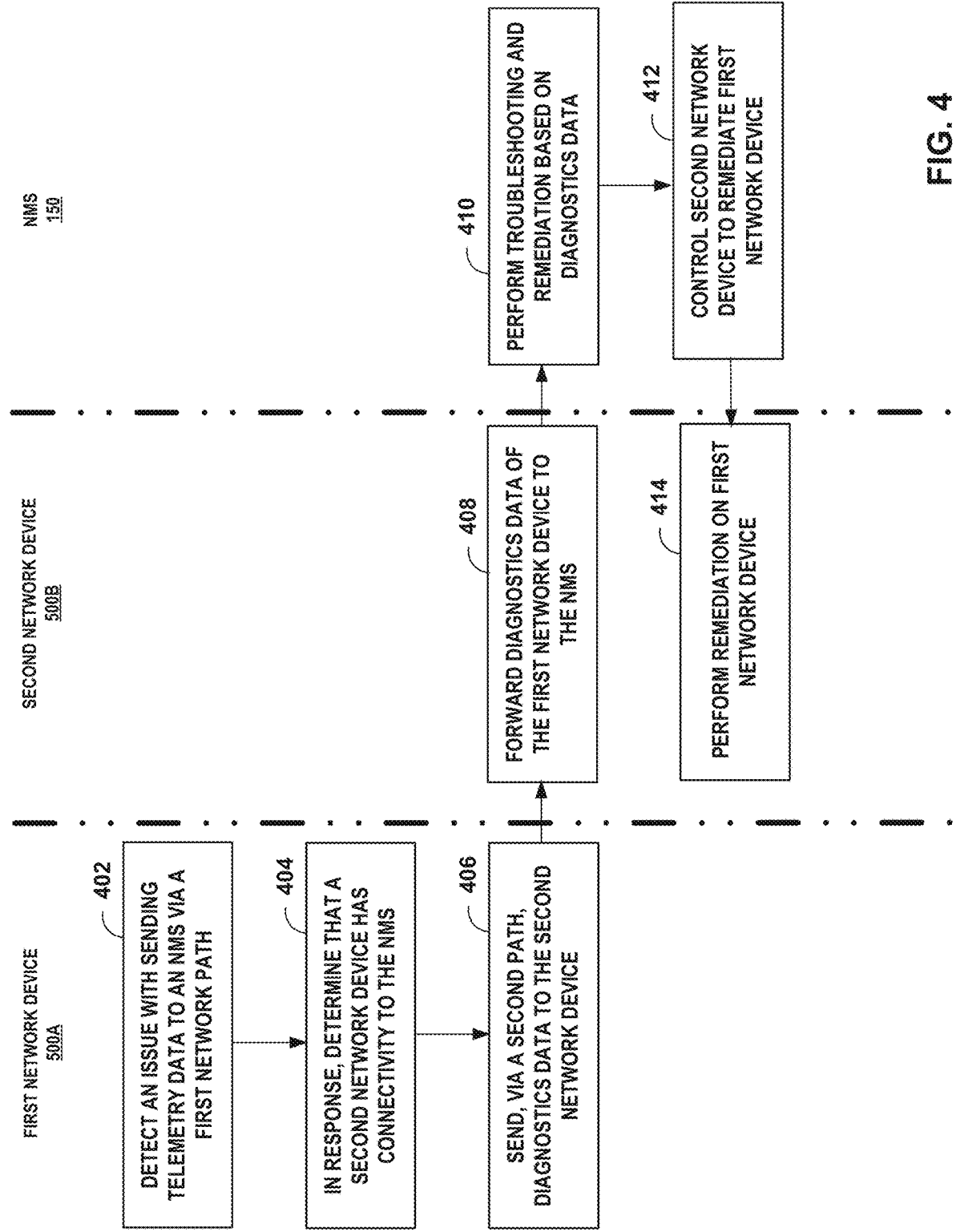
FIG. 4 is a flow diagram illustrating an example operation in accordance with one or more techniques of this disclosure.

FIG. 4 is a flow diagram illustrating an example operation in accordance with one or more techniques of this disclosure. For convenience, FIG. 4 is described with respect to network system 100 of FIG. 1 and network device 500 of FIG. 3. However, the techniques of FIG. 4 may be performed by different components of network system 100 or by additional or alternative devices.

As depicted in the example of FIG. 4, a first network device 500A detects an issue with sending telemetry data 130 to NMS 150 via a first network path (402). For example, a failure by network device 500 to send telemetry data 130 to NMS 500, or a failure by router 108B to send or receive a heartbeat message from NMS 500, may indicate that router 108B has lost connectivity with NMS 150 due to an error, such as a failed interface or path, etc. In some examples, first network device 500A is an example of router 108B of FIG. 1, and the first network path is an example of path 114B of FIG. 1. In response to detecting the issue, the first network device 500A determines that a second network device 500B has connectivity to NMS 150 (404). In some examples, second network device 500B is an example of router 108A of FIG. 1. In some examples, first network device 500A selects second network device 500B from a plurality of other network devices based on a score of a connectivity between second network device 500B and NMS 150.

First network device 500A sends diagnostics data 140 to the second network device 500B via a second network path, such as path 112A of FIG. 1 (406). In some examples, first device 500A modifies a keepalive packet to include metadata specifying diagnostics data 140, and forwards the modified packet to second network device 500B. The second network device receives diagnostics data 140 from first network device 500A and forwards, to NMS 150, the diagnostics data 140 of first network device 500A (408).

NMS 150 performs troubleshooting and remediation actions based on diagnostics data 140 for first network device 500A (410). For example, NMS 150 may use diagnostics data 140 for first network device 500A to identify a root cause of the issue with sending telemetry data 130 to NMS 150 via the first network path. In some examples, NMS 150 controls second network device 500B to remediate first network device 500A (412). For example, in response to receiving instructions from NMS 150, second network device 500B perform actions that attempt to remediate first network device 500A (414), e.g., to restore or approximate normal operation of first network device 500A. For example, NMS 150 may cause second network device 500B to install a software image upon first network device 500A, reboot first network device 500A, or restart a software application executed by first network device 500A.

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in a computer-readable medium, such as a computer-readable storage medium, containing instructions. Instructions embedded or encoded in a computer-readable storage medium may cause a programmable processor, or other processor, to perform the method, e.g., when the instructions are executed. Computer readable storage media may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer readable media.

Various examples have been described. These and other examples are within the scope of the following claims.

What is claimed is:

1. A method comprising:
   detecting, by a first network device, an issue with sending telemetry data to a wide area network (WAN) assurance system via a first network path;
   based on detecting the issue, determining, by the first network device, that a plurality of network devices have connectivity to the WAN assurance system;
   selecting, by the first network device, a second network device from among the plurality of network devices determined to have connectivity to the WAN assurance system; and
   sending, by the first network device and to the second network device via a second network path different from the first network path, diagnostics data for the second network device to forward to the WAN assurance system.

2. The method of claim 1, wherein determining that the plurality of network devices have connectivity to the WAN assurance system comprises:
receiving, by the first network device and from at least the second network device, an indication that the second network device has connectivity to the WAN assurance system.

3. The method of claim 1,
wherein the first network path comprises a WAN path, and
wherein the second network path comprises a Local Area Network (LAN) path.

4. The method of claim 1, wherein sending the diagnostics data to the second network device comprises:
modifying a keepalive packet to include metadata specifying the diagnostics data; and
sending the keepalive packet to the second network device.

5. The method of claim 1, wherein the diagnostics data comprises data indicative of one or more of:
a type of the issue;
a time of the issue;
a version of a software agent executed by the first network device; or
an interface of the first network device associated with the issue.

6. The method of claim 1,
wherein the method further comprises receiving, from each network device of the plurality of network devices, a score of a connectivity of the respective network device to the WAN assurance system;
wherein selecting the second network device comprises selecting the second network device from among the plurality of network devices based at least in part on the scores of the connectivity of the respective network devices of the plurality of network devices to the WAN assurance system.

7. The method of claim 1, further comprising:
computing, by the first network device, a score of a connectivity of the first network device to the WAN assurance system; and
sending, by the first network device and to the second network device, the score of the connectivity of the first network device to the WAN assurance system.

8. The method of claim 7, wherein computing the score of the connectivity of the first network device to the WAN assurance system is based on one or more of:
a connectivity of the first network device to the WAN assurance system over a previous time interval;
a round-trip time between the first network device and the WAN assurance system;
one or more characteristics of the second network path; or
an amount of data forwarded by the first network device to the WAN assurance system over the previous time interval.

9. The method of claim 1,
wherein detecting the issue with sending the telemetry data to the WAN assurance system via the first network path comprises detecting a failure in the first network path; and
wherein the diagnostics data includes information indicating the failure in the first path and a first interface over which the first network device used to forward network traffic over the first path, wherein the method further comprises, after sending the diagnostics data, receiving, by the first network device and from the WAN assurance system through the second network device via the second network path, instructions causing the first network device to forward the telemetry data to the WAN assurance system along a third path via a second interface of the first network device.

10. The method of claim 1,
wherein detecting the issue with sending the telemetry data to the WAN assurance system via the first network path comprises detecting a performance degradation of a software agent executed by the first network device, the software agent configured to send the telemetry data to the WAN assurance system,
wherein the diagnostics data includes information indicating the performance degradation of the software agent executed by the first network device and a version of the software agent executed by the first network device, and
wherein the method further comprises, after sending the diagnostics data, receiving, by the first network device and from the WAN assurance system through the second network device via the second network path, instructions causing the first network device to perform at least one of:
a restart of the software agent executed by the first network device; or
a reboot of the first network device.

11. The method of claim 1,
wherein the first network device executes a first version of a software agent configured to send the telemetry data to the WAN assurance system, and
wherein the method further comprises:
after sending the diagnostics data, receiving, by the first network device and from the WAN assurance system through the second network device via the second network path, a software image for a second version of the software agent; and
installing, by the first network device, the software image for the second version of the software agent.

12. A first network device configured to:
detect an issue with sending telemetry data to a wide area network (WAN) assurance system via a first network path;
based on detecting the issue, determine that a plurality of network devices have connectivity to the WAN assurance system;
select a second network device from among the plurality of network devices determined to have connectivity to the WAN assurance system; and
send, to the second network device via a second network path different from the first network path, diagnostics data for the second network device to forward to the WAN assurance system.

13. The first network device of claim 12, wherein to determine that the plurality of network devices have connectivity to the WAN assurance system, the first network device is configured to receive, from the second network device, an indication that the second network device has connectivity to the WAN assurance system.

14. The first network device of claim 12, wherein to send the diagnostics data to the second network device, the first network device is configured to:
modify a keepalive packet to include metadata specifying the diagnostics data; and
send the keepalive packet to the second network device.

15. The first network device of claim 12, wherein the diagnostics data comprises data indicative of one or more of:
- a type of the issue;
- a time of the issue;
- a version of a software agent executed by the first network device; or
- an interface of the first network device associated with the issue.

16. The first network device of claim 12, wherein the first network device is further configured to:
- compute a score of a connectivity of the first network device to the WAN assurance system; and
- send, to the second network device, the score of the connectivity of the first network device to the WAN assurance system.

17. The first network device of claim 12,
- wherein to detect the issue with sending the telemetry data to the WAN assurance system via the first network path, the first network device is configured to detect a performance degradation of a software agent executed by the first network device, the software agent configured to send the telemetry data to the WAN assurance system,
- wherein the diagnostics data includes information indicating the performance degradation of the software agent executed by the first network device and a version of the software agent executed by the first network device, and
- wherein after sending the diagnostics data, the first network device is configured to receive, from the WAN assurance system through the second network device via the second network path, instructions causing the first network device to perform at least one of:
  - a restart of the software agent executed by the first network device; or
  - a reboot of the first network device.

18. Non-transitory, computer-readable media comprising instructions that, when executed, are configured to cause processing circuitry of a first network device to:
- detect an issue with sending telemetry data to a wide area network (WAN) assurance system via a first network path;
- based on detecting the issue, determine that a plurality of network devices have connectivity to the WAN assurance system;
- select a second network device from among the plurality of network devices determined to have connectivity to the WAN assurance system; and
- send, to the second network device via a second network path different from the first network path, diagnostics data for the second network device to forward to the WAN assurance system.

* * * * *